Patented Feb. 28, 1928.

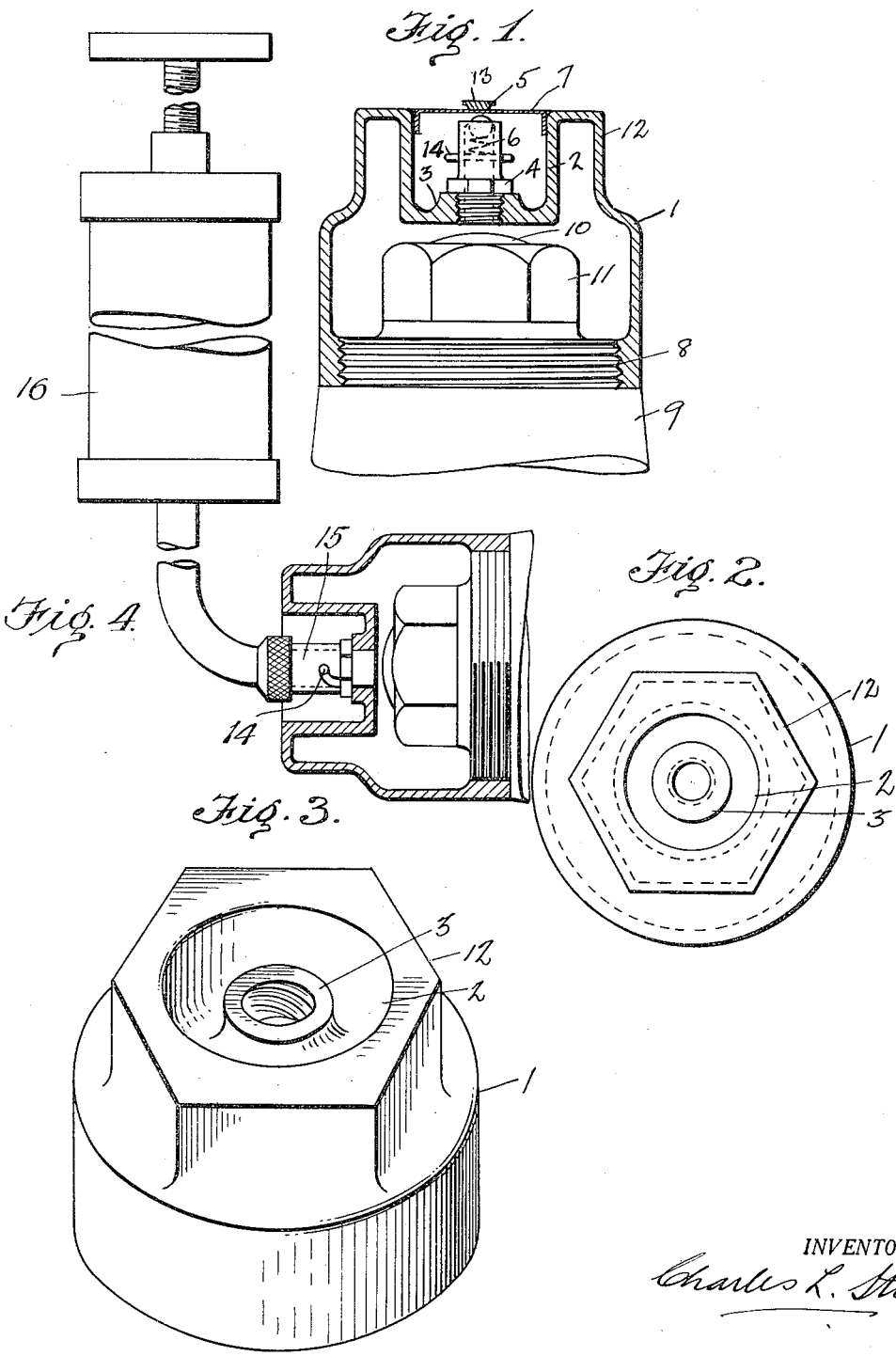

1,660,728

UNITED STATES PATENT OFFICE.

CHARLES LAWRENCE STOKES, OF LOS ANGELES, CALIFORNIA.

HUB CAP.

Application filed October 29, 1923. Serial No. 671,593.

My invention relates to improvements in hub caps, whereby a wheel spindle enclosed by the hub cap may be lubricated without removing the hub cap.

The principal object of my invention is to provide a hub cap of novel construction for forcing lubricants under high pressure to the interior of the hub cap without removing the same from the wheel hub to which it is attached.

Referring to the drawings in which the same numbers indicate like parts:

Fig. 1 is a cross section and view of my hub cap.

Fig. 2 is a view looking at the hub cap from its outer end.

Fig. 3 is a perspective view.

Fig. 4 is a longitudinal section of the hub cap on the outer end of the spindle and showing a grease gun in position for forcing grease into said cap.

In present day automobile practice, it is customary to attach a hub cap 1 to the hub of a wheel 9 by a screw thread 8. Within the hub is carried the wheel spindle 10, and 9 is held in position on 10 by a lock nut 11 and suitable washers and roller bearings (not shown).

The hub cap 1 is usually constructed having a hexagonal outer portion 12 for receiving a wrench by which 1 is attached to 9 and, being filled with lubricant, forces the same around the spindle 10 when 1 is attached to 9 by 8.

This method of lubricating the spindle 10 is very difficult because the threads in portion 8 must be very fine in order to hold the lubricants within 1 and therefore when the same threads are used against the pressure of the lubricants being forced by 1, they are very often cross-threaded and thereby destroyed, to the end that hub cap 1 is lost from off hub 9 and spindle 10 and its surrounding roller bearings become injured through the loss of lubricant and the dust which obtains entry.

In the practice of lubricating machine parts on automobiles at the present day, there is in vogue a system of high pressure lubrication whereby solid greases are forced into bearings under high pressure and this forcing is by means of a high pressure "grease gun" which contains the solid lubricant and which co-acts with a suitable high pressure nipple attached to the bearing for receiving and retaining the grease.

I construct my hub cap 1 in such fashion that such a nipple may be attached thereto, whereby spindle 10 may always be successfully lubricated without removing the cap from the hub 9 and, at the same time the nipple is protected from injury and loss in a novel manner.

In general, hub caps are generally fashioned in a stamping process out of thin sheet metal and in the process of forming hub cap 1, I arrange that a central portion 2 is depressed within the plane of the outer edge of 1. The depressed portion contains a suitable boss 3 wherein is screw-threaded a nipple 4 for receiving lubricants from the exterior of 1 and passing and retaining the same within 1.

Such a nipple embodies a valve 5 retained in position by a spring 6 and the general custom is to put the tip or coupling member 15 of the "grease gun" 16 over the nipple 4, whereupon 5 is depressed and the lubricants under pressure are forced within 4 to the interior of 1, the grease gun being positively locked and held on 4 by means of the coupling 14, such structure being generally described in U. S. Patents 1,307,733 and 1,307,734.

In order to prevent loss of 4, it is desirable to have the plane of its outer edge within the plane of the outer edge of 12, so that even though 12 should be accidentally struck and distorted, nonetheless 4 would be protected from injury and continue to perform its function of receiving and holding lubricants in 1.

It is desirable to exclude dust from reaching the nipple 4 and therefore a small dust cover 7 is provided for closing the depressed portion in 1 and 7 is made easily attachable and detachable by a button 13.

In some cases hub caps are made wherein 12 is round instead of hexagonal, in which case it is obvious that the depressed portion may be made of hexagonal cross-section but will perform the same function.

Thus it may be seen that my hub cap offers a quick and ready method of lubricating the spindles of wheels without removing the hub cap from the same so that the spindles may be frequently and easily lubricated and at the same time the lubricating means are amply protected against injury. Many people overlook lubricating their wheel spindles but the application of my hub cap is now a constant reminder and invitation to attend to the lubricating of such bearings as the front wheel spindles on automobiles.

I claim:—

1. In combination, a lubricant holding hub cap provided with a depression, and a pressure grease gun nipple secured in said depression and extending outwardly, the diameter of said depression being sufficient to permit the insertion therein of the tip of a pressure grease gun for forcing lubricant through the same into said hub cap, and means for preventing the return flow of said lubricant.

2. The combination with a wheel hub surrounding a spindle of a hub cap, having a depression, means to fasten the hub cap to the hub, means for forcing lubricants into said cap to lubricate the spindle; said last mentioned means including a grease gun nipple fastened in said depressed portion of the hub cap, a pressure grease gun engaging said nipple for forcing a lubricant into said cap, and means for preventing the return flow of said lubricant.

3. The combination with a wheel hub surrounding a spindle of a hub cap having a central depressed portion, means to fasten the hub cap to the hub, a nipple fastened in said depressed central portion of the hub cap, and a pressure grease gun attached to said nipple for forcing lubricant into said cap to lubricate the spindle, the internal diameter of said depression being greater than the external diameter of the nipple attaching portion of said grease gun.

4. A lubricant holding hub cap having a nut portion provided with an end depression and supporting a check valve.

5. A lubricant holding hub cap as called for in claim 4, wherein the check valve opens inwardly and is coaxially of said cap.

6. A vehicle wheel hub cap having a recess of any design to the depth of a grease gun tip, which is engaged in the hub cap by a tapped or tight hole, and a dust cap to enclose tip and recess.

7. A lubricant holding hub cap having an outwardly opening depression, a nipple fixed in the cap and extending outwardly within the depression but not beyond its rim, and an inwardly opening check valve within the depression.

8. A lubricant holding hub cap having a nut portion provided with an outwardly opening depression in its end and an opening through the cap in communication with the depression, a lubricant nipple fixed to the cap at the opening and projecting outwardly within the depression a distance not exceeding the depth thereof, and an inwardly opening valve in said nipple.

9. In combination, a lubricant holding hub cap having a nut portion provided with an axial end depression, the bottom of said depression being provided with an axial opening, a grease gun nipple secured in said opening and extending axially outwardly into said depression a distance not further than the outer end of said cap, and an inwardly opening check valve in said nipple.

Signed at Wilmington, in the County of Los Angeles and State of California, this 24th day of September, A. D. 1923.

CHARLES LAWRENCE STOKES.